US011665010B2

(12) United States Patent
Mishra

(10) Patent No.: US 11,665,010 B2
(45) Date of Patent: May 30, 2023

(54) INTELLIGENT MEETING RECORDING USING ARTIFICIAL INTELLIGENCE ALGORITHMS

(71) Applicant: Avaya Management L.P., Durham, NC (US)

(72) Inventor: Amit Mishra, Broomfield, CO (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/402,278

(22) Filed: Aug. 13, 2021

(65) Prior Publication Data

US 2023/0046881 A1 Feb. 16, 2023

(51) Int. Cl.
*H04L 12/18* (2006.01)
*G06N 20/00* (2019.01)

(52) U.S. Cl.
CPC ......... *H04L 12/1831* (2013.01); *G06N 20/00* (2019.01); *H04L 12/1818* (2013.01)

(58) Field of Classification Search
CPC .. H04L 12/1818; H04L 12/1831; G06N 20/00
See application file for complete search history.

(56) References Cited

U.S. PATENT DOCUMENTS

| 9,154,631 | B2 | 10/2015 | Goguen et al. |
| 9,253,330 | B2 | 2/2016 | Boss et al. |
| 2018/0176508 | A1* | 6/2018 | Pell ..................... H04L 65/1089 |
| 2020/0349429 | A1* | 11/2020 | Vendrow ................. H04N 7/15 |
| 2021/0406099 | A1* | 12/2021 | Feuz ....................... G06F 9/542 |
| 2021/0406449 | A1* | 12/2021 | Meling ................ G06F 40/166 |
| 2022/0116410 | A1* | 4/2022 | Sharifi ............... H04L 63/1416 |
| 2022/0180221 | A1* | 6/2022 | Huo ....................... G06Q 10/00 |
| 2022/0217135 | A1* | 7/2022 | Jarvis ..................... G06F 9/451 |

OTHER PUBLICATIONS

Chen et al., "SVDFeature: A Toolkit for Feature-based Collaboratie Filteing", Journal of Macine Learning Research, Dec. 2012.*
Zhang et al., "Deep Learning Based Recommender System: A Survey and New Perpsectives", ACM Computing, Feb. 2019.*

* cited by examiner

*Primary Examiner* — Todd L Barker
(74) *Attorney, Agent, or Firm* — Sheridan Ross P.C.

(57) ABSTRACT

A device may analyze data associated with a conference call. The device may provide at least a portion of the data to a machine learning model. The device may receive an output from the machine learning model in response to the machine learning model processing at least the portion of the data. The output may include a probability score associated with a determination made by the machine learning model with respect to capturing multimedia content associated with the conference call. The device may output a notification associated with capturing the multimedia content based on the output from the machine learning model.

20 Claims, 5 Drawing Sheets

INTELLIGENT MEETING RECORDING USING ARTIFICIAL INTELLIGENCE ALGORITHMS

FIELD

The present disclosure relates to systems and methods for alerting a user to record or capture multimedia content during a meeting, such as during a conference call.

BACKGROUND

Some devices may support communications applications capable of various communication modalities such as, for example, audio, video, and text communications. For example, some communications applications may support conference meetings (e.g., online meetings) in which attendees may communicate via audio, video, and/or text. In some cases, for example, some communications applications may support recording multimedia content (e.g., video, audio, text, etc.) during a meeting.

BRIEF SUMMARY

The described techniques relate to improved methods, systems, devices, and apparatuses that support an artificial intelligence meeting assistant. Generally, the described techniques provide for a facility (e.g., using artificial intelligence (AI) algorithms) to alert or notify a user to initiate a recording of a meeting (e.g., an online meeting, a conference call).

A method, device, and system are provided that include: analyzing data associated with a conference call; providing at least a portion of the data to a machine learning model; receiving an output from the machine learning model in response to the machine learning model processing at least the portion of the data, the output including a probability score associated with a determination made by the machine learning model with respect to capturing multimedia content associated with the conference call; and outputting a notification associated with capturing the multimedia content based on the output from the machine learning model.

These and other needs are addressed by the various embodiments and configurations of the present disclosure. The present disclosure can provide a number of advantages depending on the particular configuration. These and other advantages will be apparent from the disclosure contained herein.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "analyze," "process," "execute," "manage," "calculate," and "compute," and variations thereof, as used herein, are used interchangeably and include any type of methodology, process, mathematical operation or technique. The term "manage" includes any one or more of the terms determine, recommend, configure, organize, show (e.g., display), hide, update, revise, edit, and delete, and includes other means of implementing actions (including variations thereof).

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
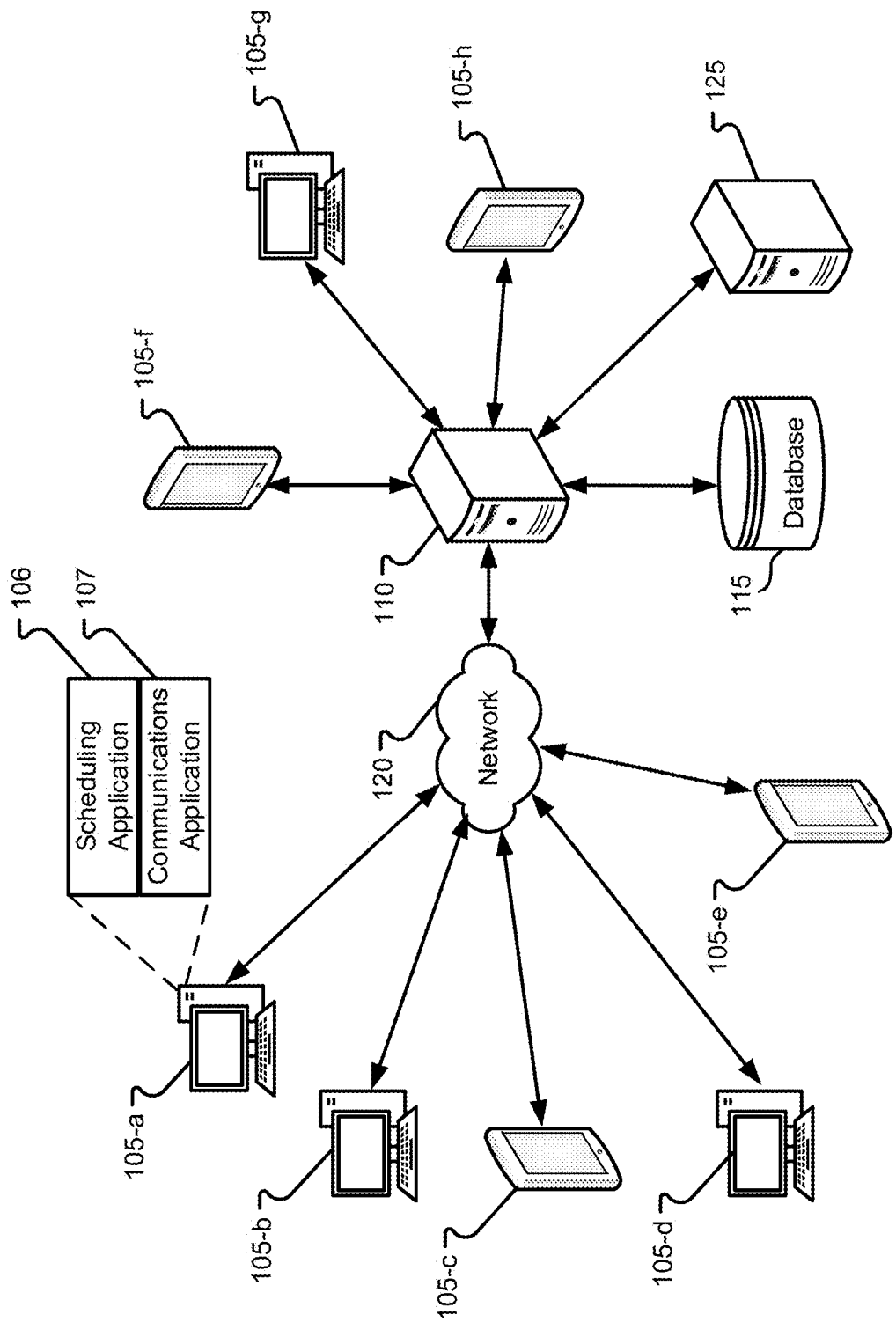
FIG. 1 illustrates an example of a system that supports intelligent meeting recording using AI algorithms in accordance with aspects of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides illustrative embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the illustrative embodiments will provide those skilled in the art with an enabling description for implementing an illustrative embodiment. It should however be appreciated that the present disclosure may be practiced in a variety of ways beyond the specific detail set forth herein.

Some devices may support communications applications for conducting virtual meetings (also referred to herein as online meetings, conference calls, etc.) between multiple users. Some communications applications, for example, may support features for communicating and/or recording multimedia content (e.g., audio, video, etc.) during a meeting. In some cases, some communications applications may output a notification to attendees (e.g., moderators, hosts, participants) when a recording is initiated, paused, and/or ended.

In some cases, however, issues may arise in which a moderator of the meeting inadvertently forgets to record a meeting. In many cases, it may be incumbent on other users attending the meeting to remind the moderator to initiate the recording. In some instances, the other users attending the meeting may be unaware that the moderator intended to record the meeting, and the users may refrain from alerting the moderator that the meeting is not being recorded. Accordingly, for example, the meeting may fail to be recorded entirely, or the moderator may initiate recording the meeting after substantial discussions have already occurred. In some cases, such failures to record a meeting may result in user inconvenience for users who may wish to relisten to the details of the meeting.

According to example aspects of the present disclosure, a device supportive of intelligent meeting recording using AI algorithms is described herein. For example, aspects of the present disclosure may support providing a notification and/or an auto-record feature to a moderator for recording a meeting based on recording history (e.g., previous instances of recording a meeting). In some aspects, providing the notification and/or the auto-record feature may improve user experience and user convenience during meetings, for example, by reducing the reliance on a moderator to remember to record the meetings. In some cases, aspects described herein may reduce the reliance on meeting participants to provide reminders to the moderator with respect to recording meetings. Examples of aspects described herein may mitigate instances in which a moderator states, to a meeting invitee, "Please make sure to remind me to record the meeting."

In an example, a conferencing system described herein may generate and output notifications to a moderator (e.g., a meeting owner), based on recording history, to record a meeting (also referred to herein as an online meeting). For example, during an online meeting, the system may provide a prompt (e.g., a pop-up notification) indicating "You are not recording this meeting. Would you like to record after an average duration X (where X is when the "real meeting" usually starts)?"

In some examples, for an online meeting having a start time of 9:00 AM, the system may identify previous online meetings having similar attributes (e.g., based on content, context, attendees, etc.) as the online meeting. The system may determine that substantial discussions (e.g., the "real meeting") during the previous online meetings previously started at three (3) minutes following scheduled meeting start times (e.g., for a start time of 9:00 AM, the substantial discussion started at 9:03 AM). In some cases, for example, the system may determine that meeting recordings were initiated (e.g., on average) at 3 minutes following the meeting start time (e.g., in correspondence with the substantial discussions). In some aspects, the system may identify that, out of six (6) previous online meetings having similar attributes to the online meeting, five (5) of the previous online meetings were recorded. According to example aspects of the present disclosure, the system may provide a prompt (e.g., a pop-up notification) to the moderator and/or meeting attendees to record an online meeting, based on whether the previous online meetings having similar attributes (e.g., based on content, context, conversations during the meetings, attendees, etc.) were recorded. Accordingly, for example, the system may output a notification reminding the moderator and/or meeting attendees to initiate a recording. Alternatively, or additionally, the notification may request whether the system should begin recording.

In some aspects, for an online meeting in which a user (e.g., the moderator) has not initiated a recording, the system may access and analyze data (e.g., audio data, video data, text data, meeting invitations, etc.) associated with the online meeting. In some examples, the system may access and analyze data associated with a quantity of previous online meetings (e.g., n meetings, where n is an integer value) associated with the user. In some cases, the system may access and analyze the data at any temporal instance associated with the online meeting (e.g., at the start of the online meeting; when generating a meeting invitation associated with the online meeting, etc.).

In an example, the system may analyze user behavior (e.g., whether the moderator initiated a recording) and/or meeting setups (e.g., scheduling information, invitees, etc.) associated with the previous online meetings. For example, based on a recording history of the previous online meetings (e.g., n−1 meetings recorded by the user) and whether the previous online meetings have similar attributes to the online meeting (e.g., based on content, context, conversations during the meetings, attendees, etc.), the system may generate and output a notification suggesting to record the online meeting. For example, the notification may indicate "The system has detected that you are not recording. In the past you had recorded n−1 of the n meetings. Would you like to record the present meeting?"

In some aspects, the system may output the notification at a temporal instance (e.g., after y minutes) following a start time (e.g., a scheduled start time, an actual start time) of the online meeting. In some cases, the system may output the notification using a scripting language (e.g., JavaScript, etc.) pop-up. In an example, the notification may include a user interface for confirming (e.g., an "OK" button) or cancelling (e.g., a "Cancel" button) the recording.

In some aspects, the notification may include a link (e.g., a Uniform Resource Locator (URL) link, a Hyperlink, etc.) associated with accessing recordings (e.g., audio recordings, video recordings, corresponding transcripts, etc.) of any of the previous n−1 meetings. Accordingly, for example, the system may provide a reference resource to a moderator, based on which the moderator may determine whether to record an online meeting. As described herein, the system may support autonomous recording of online meetings and/or semi-autonomous recording of online meetings (e.g., based on a user input associated with a notification output by the system) based on recording histories associated with previous online meetings. The techniques for autonomous and/or semi-autonomous recording of online meetings may reduce instances in which a moderator forgets to record an online meeting. In some aspects, the techniques described herein may reduce any burden experienced by participants in association with reminding the moderator to record the online meeting.

Examples of the aspects described herein may provide advantages over other communications applications. For example, the example aspects described herein provide for an increase in user awareness and user convenience when hosting and/or attending an online meeting. In some aspects, the device may support data models (e.g., neural network models) that are tunable according to user parameters, user configurations, and/or user preferences.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 illustrates an example of a system 100 that supports intelligent meeting recording using AI algorithms in accordance with aspects of the present disclosure.

The system 100 may include communication devices 105 (e.g., communication device 105-a through communication device 105-h), an application server 110, a database 115, a communication network 120, and one or more other servers 125 (e.g., presence servers). The communication network 120 may facilitate machine-to-machine communications between any of the communication device 105 (or multiple communication devices 105), the application server 110, the other servers 125, or one or more databases (e.g., database 115). The communication network 120 may include any type of known communication medium or collection of communication media and may use any type of protocols to transport data between endpoints. The communication network 120 may include wired communications technologies, wireless communications technologies, or any combination thereof.

A communication device 105 may transmit or receive data packets to one or more other devices (e.g., another communication device 105, the application server 110, the other servers 125) via the communication network 120 and/or via the application server 110. For example, the communication device 105-a may communicate (e.g., exchange data packets) with the communication device 105-b via the communications network 120. In another example, the communication device 105-a may communicate with another device (e.g., communication device 105-e, database 115, server 125) via the communications network 120 and the application server 110.

Non-limiting examples of the communication devices 105 may include, for example, personal computing devices or mobile computing devices (e.g., laptop computers, mobile phones, smart phones, smart devices, wearable devices, tablets, etc.). In some examples, the communication devices 105 may be operable by or carried by a human user. In some aspects, the communication devices 105 may perform one or more operations autonomously or in combination with an input by the user.

The communication devices 105 may support one or more scheduling applications 106 (e.g., calendar applications, meeting scheduler applications) for scheduling meetings between users of the communication devices 105. The scheduling applications 106 may support generating meeting invitations described herein for scheduling meetings.

In some aspects, the communication devices 105 may support one or more communications applications 107 (also referred to herein as an integrated communications applications or conferencing applications) for communication between the communication devices 105. The communications applications 106, for example, may support integrated audio, video, and text communications between communication devices 105. In some cases, the communications applications 107 may support instant messaging, availability services, and roster management services.

In an example, the application server 110 may be configured to provide application services to the communication devices 105. The application services may include communication services associated with one or more communications applications 106. Example aspects of the communications applications 106 are described herein with reference to FIG. 2.

Wired communications technologies may include, for example, Ethernet-based wired local area network (LAN) connections using physical transmission mediums (e.g., coaxial cable, copper cable/wire, fiber-optic cable, etc.).

Wireless communications technologies may include, for example, cellular or cellular data connections and protocols (e.g., digital cellular, personal communications service (PCS), cellular digital packet data (CDPD), general packet radio service (GPRS), enhanced data rates for global system for mobile communications (GSM) evolution (EDGE), code division multiple access (CDMA), single-carrier radio transmission technology (1×RTT), evolution-data optimized (EVDO), high speed packet access (HSPA), universal mobile telecommunications service (UMTS), 3G, long term evolution (LTE), 4G, and/or 5G, etc.), Bluetooth, Bluetooth low energy, Wi-Fi, radio, satellite, infrared connections, and/or ZigBee communication protocols.

The Internet is an example of the communication network 120 that constitutes an Internet Protocol (IP) network consisting of multiple computers, computing networks, and other communication devices located in multiple locations, and components in the communication network 120 (e.g., computers, computing networks, communication devices) may be connected through one or more telephone systems and other means. Other examples of the communication network 120 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, a cellular network, and any other type of packet-switched or circuit-switched network known in the art. In some cases, the communication network 120 may include of any combination of networks or network types. In some aspects, the communication network 120 may include any combination of communication mediums such as coaxial cable, copper cable/wire, fiber-optic cable, or antennas for communicating data (e.g., transmitting/receiving data).

Figure 2:
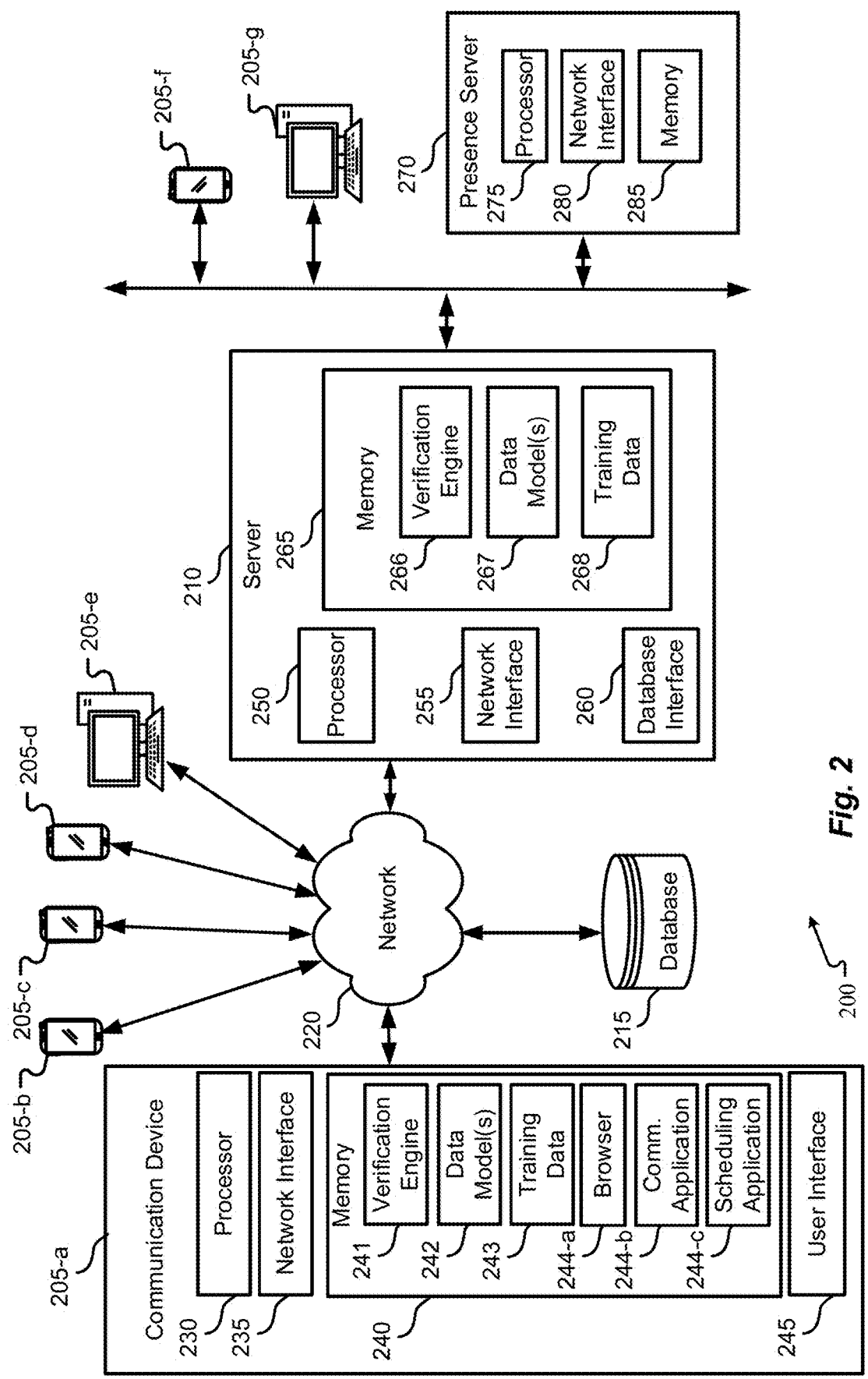
FIG. 2 illustrates an example of a system that supports intelligent meeting recording using AI algorithms in accordance with aspects of the present disclosure.

Example aspects of components and functionalities of the communication devices 105, the application server 110, the database 115, and the communication network 120 are provided with reference to FIG. 2.

While the illustrative aspects, embodiments, and/or configurations illustrated herein show the various components of the system 100 collocated, certain components of the system 100 can be located remotely, at distant portions of a distributed network, such as a LAN and/or the Internet, or within a dedicated system. Thus, it should be appreciated, that the components of the system 100 can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

FIG. 2 illustrates an example of a system 200 that supports intelligent meeting recording using AI algorithms in accordance with aspects of the present disclosure. In some examples, the system 200 may be implemented by aspects of the system 100 described with reference to FIG. 1. The system 200 may include communication devices 205 (e.g., communication device 205-$a$ through communication device 205-$g$), an application server 210, a database 215, and a communication network 220. The communication devices 205, the application server 210, the database 215, and the communications network 220 may be implemented, for example, by like elements described with reference to FIG. 1.

The communication network 220 may facilitate machine-to-machine communications between any of the communication device 205 (or multiple communication devices 205), the application server 210, and one or more databases (e.g., database 215). The communication network 220 may include any type of known communication medium or collection of communication media and may use any type of protocols to transport messages between endpoints. In some aspects, the communication network 220 may include wired communications technologies, wireless communications technologies, or any combination thereof. In an example, the communication devices 205, and the application server 210 may support communications over the communications network 220 between multiple entities (e.g., users). In some cases, the system 200 may include any number of communication devices 205, and each of the communication devices 205 may be associated with a respective entity.

In various aspects, settings of any of the communication devices 205 or the application server 210 may be configured and modified by any user and/or administrator of the system 200. Settings may include parameters associated with analyzing data associated with a meeting. In some aspects, the meeting and communications (e.g., audio, video, text, etc.) associated with the meeting may be managed by a communications application 244-$b$ at a communication device 205. The communications application 244-$b$ may be supported by (e.g., hosted by) the application server 210. In some aspects, scheduling of the meeting may be managed by a scheduling application 244-$c$ at a communication device 205. The scheduling application 244-$c$ may be supported by the application server 210. Example aspects of the communications application 244-$b$ and the scheduling application 244-$c$ are described later herein.

According to example aspects of the present disclosure, a communication device 205 (e.g., a verification engine 241, example aspects of which are later described herein) and/or the application server 210 (e.g., a verification engine 266, example aspects of which are later described herein) may analyze data provided by the communications application 244-$b$ and/or the scheduling application 244-$c$. In some cases, a communication device 205 and/or a server 210 may access such data from (and store such data to) a memory 240 of a communication device 205, a memory 265 of a server 210, and/or a database 215.

The data associated with a meeting may include data (e.g., audio data, video data, text data) input and/or monitored by the communications application 244-$b$ during the meeting. Alternatively, or additionally, the data associated with the meeting may include data (e.g., a meeting invitation, content of the meeting invitation, etc.) input at and/or communicated by the scheduling application 244-$c$ in association with the meeting. Examples of data associated with a meeting are described herein.

In an example, the data associated with a meeting may include identification information of users during the meeting. For example, the identification information may include text-based identifiers (e.g., name, initials, username), contact information (e.g., an email address, a telephone number, etc.), a graphical icon, a photo image, and/or a video image associated with a respective user. In some aspects, the identification information may be input and/or detected at the communications application 244-$b$ and/or the scheduling application 244-$c$. In some cases, the communications application 244-$b$ may cross reference users present during the meeting with an attendee list included in a meeting invitation provided by the scheduling application 244-c.

In another example, the data associated with the meeting may include user presence information (e.g., user present, user not present) as detected by the communications application 244-b during the meeting. In some cases, the data associated with the meeting may include user activity information (e.g., meeting recording enabled or disabled, video enabled or disabled, audio enabled or disabled, content sharing enabled or disabled, whether the user is actively speaking or presenting, etc.) as detected by the communications application 244-b during the meeting.

In some aspects, the data associated with the meeting may include temporal information (e.g., date, day of the week, actual start time, present meeting duration etc.) of the meeting as monitored by the communications application 244-b. In some aspects, the data associated with the meeting may include temporal information such as scheduling information of the meeting, provided by the scheduling application 244-c.

In some other examples, the data associated with the meeting may include multimedia content (e.g., audio communications, video communications, text communications) input at a communication device 205 during the meeting. In some cases, the communication device 205 (e.g., verification engine 241) and/or the application server 210 (e.g., verification engine 266) may extract content (e.g., speech inputs, text inputs, etc.) included in the multimedia content. In some aspects, the communication device 205 and/or the application server 210 may extract contextual information (e.g., topics discussed during the meeting, a user intent to record the meeting, etc.) from the content information. Example aspects of the content information and the contextual information are described later herein.

In some examples, the data associated with a meeting may include a meeting invitation generated and/or communicated by the scheduling application 244-c in association with the meeting. For example, for a meeting (e.g., a current meeting, a previous meeting), the data may include identification information of users (e.g., hosts, moderators, invitees, etc.) indicated in the meeting invitation. In some aspects, the data may include an invitation status of the users. For example, the invitation status may indicate "meeting accepted", "meeting declined", "tentative acceptance", etc. In some cases, the data may include a user classification (e.g., host, moderator, "required attendee", "optional attendee", etc.) associated with the users.

In some aspects, the data associated with a meeting may include content of the meeting invitation. For example, the data may include text included in a text entry field (e.g., subject, body, etc.) of the meeting invitation. In some cases, the communication device 205 (e.g., verification engine 241) and/or the application server 210 (e.g., verification engine 266) may extract and analyze content information (e.g., text, word strings, etc.) from text included in a text entry field of the meeting invitation.

In some examples, the content of the meeting invitation may include multimedia content (e.g., text-based documents, videos, image data, etc.) attached to the meeting invitation. In some cases, the communication device 205 and/or the application server 210 may extract and analyze content information (e.g., text, word strings, images, etc.) from the multimedia content attached to the meeting invitation.

In some other cases, the communication device 205 and/or the application server 210 may extract and analyze content information from corresponding electronic communications (e.g., e-mail communications, other text-based communications, etc.) associated with a meeting invitation. The communication device 205 and/or the application server 210 may extract contextual information (e.g., a discussion topic, an intent to record a meeting, etc.) from any of the content information described herein. Example aspects of the content information and the contextual information are described later herein.

In some other examples, the data associated with a meeting may include temporal information (e.g., scheduled date, scheduled start time, scheduled end time, duration etc.) associated with the meeting invitation. In some cases, the data may include location information and/or meeting type (e.g., in-person, virtual, telephonic, etc.) indicated in the meeting invitation.

In some examples, the data associated with a meeting may include an indication of whether a recording has been scheduled (e.g., via the communications application 244-b and/or the scheduling application 244-c) for the meeting. In some aspects, the data may include an indication of temporal information (e.g., scheduled start time, scheduled end time, duration etc.) corresponding to the scheduled recording.

In some aspects, the data associated with a meeting may include user classifications (e.g., "host", "co-host", "moderator", "invitee", etc.) corresponding to users associated with the meeting. In some cases, for an invitee, the user classification may include an indication of whether the invitee is a "required attendee" or an "optional attendee". In some examples, the user classifications may be indicated at the communications application 244-b and/or the scheduling application 244-c.

Settings may be configured to be personalized for one or more communication devices 205, users of the communication devices 205, and/or other groups of entities, and may be referred to herein as profile settings, user settings, or organization settings. In some aspects, rules and settings may be used in addition to, or instead of, the parameters described herein. In some examples, the rules and/or settings may be personalized by a user and/or administrator for any variable, threshold, user (user profile), communication device 205, entity, or groups thereof.

A communication device 205 (e.g., communication device 205-a) may include a processor 230, a network interface 235, a memory 240, and a user interface 245. In some examples, components of the communication device 205 (e.g., processor 230, network interface 235, memory 240, user interface 245) may communicate over a system bus (e.g., control busses, address busses, data busses) included in the communication device 205. In some cases, the communication device 205 may be referred to as a computing resource.

In some cases, a communication device 205 (e.g., communication device 205-a) may transmit or receive packets to one or more other devices (e.g., another communication device 205, the application server 210, the database 215) via the communication network 220, using the network interface 235. The network interface 235 may include, for example, any combination of network interface cards (NICs), network ports, associated drivers, or the like. Communications between components (e.g., processor 230, memory 240) of the communication device 205 and one or more other devices (e.g., another communication device 205, the database 215) connected to the communication network 220 may, for example, flow through the network interface 235.

The processor 230 may correspond to one or many computer processing devices. For example, the processor 230 may include a silicon chip, such as a Field Programmable Gate Array (FPGA), an Application-Specific Integrated Circuit (ASIC), any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute the instructions sets stored in a corresponding memory (e.g., memory 240 of the communication device 205). For example, upon executing the instruction sets stored in memory 240, the processor 230 may enable or perform one or more functions of the communication device 205.

The processor 230 may utilize data stored in the memory 240 as a neural network. The neural network may include a machine learning architecture. In some aspects, the neural network may be or include any machine learning network such as, for example, a deep learning network, a convolutional neural network, an artificial neural network (ANN), or the like. Some elements stored in memory 240 may be described as or referred to as instructions or instruction sets, and some functions of the communication device 205 may be implemented using machine learning techniques.

The memory 240 may include one or multiple computer memory devices. The memory 240 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 240, in some examples, may correspond to a computer-readable storage media. In some aspects, the memory 240 may be internal or external to the communication device 205.

The memory 240 may be configured to store instruction sets, neural networks, and other data structures (e.g., depicted herein) in addition to temporarily storing data for the processor 230 to execute various types of routines or functions. For example, the memory 240 may be configured to store program instructions (instruction sets) that are executable by the processor 230 and provide functionality of a verification engine 241 described herein. The memory 240 may also be configured to store data or information that is useable or capable of being called by the instructions stored in memory 240. One example of data that may be stored in memory 240 for use by components thereof is a data model(s) 242 (also referred to herein as a neural network model, a trained model, a detection model, a prediction model, a machine learning model, a model of a machine learning network, etc.) and/or training data 243 (also referred to herein as a training data and feedback).

The verification engine 241 may include a single or multiple engines. The communication device 205 (e.g., the verification engine 241) may utilize one or more data models 242 for recognizing and processing information obtained from other communication devices 205, the application server 210, and the database 215. In some aspects, the communication device 205 (e.g., the verification engine 241) may build and/or update one or more data models 242 based on learned information included in the training data 243. In some aspects, the verification engine 241 and the data models 242 may support forward learning based on the training data 243. The verification engine 241 may have access to and use one or more data models 242. For example, the data model(s) 242 may be built and updated by the verification engine 241 based on the training data 243. The data model(s) 242 may be provided in any number of formats or forms. Non-limiting examples of the data model(s) 242 include Decision Trees, Support Vector Machines (SVMs), Nearest Neighbor, and/or Bayesian classifiers.

In some examples, the training data 243 may include communication data (e.g., audio data such as speech inputs, text data corresponding to the speech inputs, inputted text data, video data such as streamed or recorded video, etc.) associated with the communication device 205. In some cases, the communication data may include communication histories (e.g., transmitted communication data) between the communication device 205 and other communication devices 205 (e.g., any of communication device 205-b through communication device 205-e), real-time communication data between the communication device 205 and other communication devices 205, data transmissions between the communication device 205 and the application server 210, etc. In some aspects, communication histories between a communication device 205 (e.g., communication device 205-a) and another communication device 205 (e.g., communication device 205-b) may include communication between a user of the communication device 205 and a user of the other communication device 205. In some aspects, the training data 243 may include outputs (e.g., predictions) by the verification engine 241. In some examples, the training data 243 may include past actions of a user with respect to previous predictions by the verification engine 241.

The training data 243 may include any data generated, communicated, and/or monitored by a communications application 244-b and/or scheduling application 244-c as described herein with respect to a meeting (e.g., a current meeting, a previous meeting, multiple previous meetings, etc.).

For example, the training data 243 may include temporal information (e.g., start time, stop time, duration) associated with capturing multimedia content associated with at least one previous meeting. In an example, the training data 243 may include temporal information indicating a recording start time of a previous meeting and/or a recording end time of the previous meeting. In other examples, the training data 243 may include temporal information indicating a meeting start time (e.g., scheduled, actual, or both) and/or a meeting end time (e.g., scheduled, actual, or both) of a previous meeting. In some examples, for a previous meeting which was recorded, the training data 243 may include temporal information (e.g., temporal durations, temporal instances) indicating when one or more content topics were discussed during the previous meeting. In some examples, for a previous meeting which was recorded, the training data 243 may include content information and/or contextual information associated with initiating and/or ending a recording of the previous meeting.

In some examples, the training data 243 may include a meeting invitation associated with the previous meeting. In some aspects, the training data 243 may include identification information, user classification (e.g., "host", "co-host", "moderator", "invitee", "required attendee", "optional attendee", etc.), and/or invitation status of users included in the meeting invitation. In some aspects, the training data 243 may include attendance information of the users included in the meeting invitation. For example, for previous meetings which were recorded (and for previous meetings which were not recorded), the training data 243 may include an indication of users that attended and/or users that did not attend the previous meetings.

In another example, the training data 243 may include content information (e.g., multimedia content such as text, video, audio, etc.) associated with a previous meeting. The content information may be included in the meeting invitation. For example, the content may be included in a text entry field of the meeting invitation, attached to the meeting invitation, etc. In some cases, the content information may be included in a recording (e.g., an audio recording, a video recording, etc.) of the previous meeting. In some examples, the audio data may include transcripts corresponding to audio data of a recording.

In other examples, the training data 243 may include contextual information (e.g., a discussion topic, an intent to record a meeting, etc.) associated with the previous meeting. For example, the training data 243 may include contextual information extracted (e.g., by the communication device 205 or the application server 210) from content of the meeting invitation. In another example, the training data 243 may include contextual information extracted (e.g., by the communication device 205 or the application server 210) from the recording of the previous meeting.

In some aspects, the training data 243 may include a recording history of a previous meeting. For example, the training data 243 may include an indication of whether the previous meeting was recorded. In some aspects, the training data 243 may include a recording history of a set of previous meetings (e.g., all meetings) associated with a user, a user group, etc. For example, the training data 243 may include indicate that, for n meetings (where n is an integer value) associated with a user, n−1 of the meetings were recorded.

The verification engine 241 may be configured to analyze any data (e.g., audio data, text data, video data, content) provided or monitored by any of the communication devices 205 (e.g., communications application 244-b) and/or the application server 210 (e.g., supporting the communications application 244-b). The data may include, for example, historical data (e.g., previously communicated by a communication device 205, previously recorded by the communication device 205), or real-time data.

In some aspects, the verification engine 241 may be configured to analyze data (e.g., audio data, text data, video data, content) provided by any of the communication devices 205 (e.g., communications application 244-b, scheduling application 244-c) and/or the application server 210 (e.g., supporting the communications application 244-b and/or the scheduling application 244-c).

The verification engine 241 may be configured to receive information from other communication devices 205, and/or the application server 210. The verification engine 241 may be configured to analyze input data (e.g., audio data, video data, text data) received at a communication device 205 in associated with one or more users. For example, the verification engine 241 may extract content and/or contextual information of any data associated with a meeting as described herein. Alternatively, or additionally, the verification engine 241 may be configured to analyze data (e.g., content and/or contextual information) included in a corresponding meeting invitation. In some aspects, for a meeting implemented by a communications application 244-b at a communication device 205, the verification engine 241 may determine a probability score and/or confidence score corresponding to recording multimedia content associated with the meeting.

In some aspects, the verification engine 241 may build any number of user profiles using automatic processing, using artificial intelligence and/or using input from one or more users associated with the communication devices 205. The user profiles may be associated with, for example, respective entities (users) of different communication devices 205. The verification engine 241 may use automatic processing, artificial intelligence, and/or inputs from one or more users of the communication devices 205 to determine, manage, and/or combine information relevant to a user profile.

The verification engine 241 may update (e.g., continuously, periodically) user profiles based on new information that is relevant to the user profiles. The verification engine 241 may receive new information from any communication device 205, the application server 210, the database 215, etc. Profile information may be organized and classified in various manners. In some aspects, the organization and classification of profile information may be determined by automatic processing, by artificial intelligence and/or by one or more users of the communication devices 205.

The verification engine 241 may store audio profiles (e.g., voice profiles) associated with users of the communication devices 205. In an example, the verification engine 241 may store the audio profiles in the memory 240 (e.g., in a database included in the memory 240), the database 215, and/or memory 265 of the application server 210. The audio profiles may include, for example, speech patterns or speech mannerisms associated with the users. Alternatively, or additionally, the verification engine 241 may store video profiles (e.g., image profiles) associated with users of the communication devices 205. In an example, the verification engine 241 may store the video profiles in the memory 240 (e.g., in a database included in the memory 240), the database 215, and/or memory 265 of the application server 210. The video profiles may include, for example, facial recognition features, facial expressions, physical mannerisms, common gestures, or gesture patterns associated with the users. In some aspects, the verification engine 241 may identify, from the audio profiles and/or video profiles, any speech patterns, phrases, visual features, etc. associated with instances in which a user may initiate a recording of a meeting.

Data within the database of the memory 240 may be updated, revised, edited, or deleted by the verification engine 241. In some aspects, the verification engine 241 may support continuous, periodic, and/or batch fetching of data (e.g., audio data, text data, video data, content) of users associated with the communication devices 205, the communications application 244-b, the scheduling application 244-c, or any combination thereof. The verification engine 241 may fetch or receive the data from the communication devices 205, the application server 210, or any combination thereof. In some examples, the fetched data may include data described herein that is associated with a meeting (e.g., a current meeting, a previous meeting, etc.). For example, the fetched data may include recordings of meetings (e.g., previous meetings), content information (e.g., transcriptions) of the recordings, contextual information of the recordings, user information (e.g., identification information, presence information, etc.) associated with the meetings, temporal information associated with the recordings, etc. In some examples, the fetched data may include meeting invitations corresponding to the meetings, content information of the meeting invitations, contextual information of the meeting invitations, user information (e.g., identification information, invitation status, etc.) associated with the meeting invitations, temporal information associated with the recordings, etc.

Information stored in the database included in the memory 240 may include and is not limited to communication information, user information, key words (e.g., key words or phrases associated with initiating and/or ending a recording of a meeting), configurations, settings, variables, and properties. Further, information regarding the relevance of different types of content, as well as how to determine relevance (e.g., rules, settings, source(s) of content, rankings of content, location of key words/phrases, repetition of key words/phrases, definitions of relevance, etc.) or contextual information associated with content may be stored in the database included in the memory 240.

The verification engine 241 may create, select, and execute processing decisions. Processing decisions may include, for example, notification decisions associated with a communications application 244-*b* provided at a communication device 205 or the application server 210. In some aspects, processing decisions may include decisions associated with initiating and/or ending a recording of a meeting (e.g., based on a user input, automatically based on predictions by a machine learning network) at a communication device 205, outputting notifications indicating suggested parameters (e.g., recording start time, recording end time, etc.) associated with recording a meeting at a communication device 205, or the like.

In some other aspects, the verification engine 241 may create, select, and execute processing operations. The processing operations may include determining contextual information associated with audio content (e.g., speech inputs) and/or text content (e.g., text inputs) at the communication device 205, the communications application 244-*b*, and/or the scheduling application 244-*c*. For example, the processing operations may include natural language processing operations, based on which the verification engine 241 and/or the processor 230 may determine the contextual information.

In an example, the verification engine 241 and/or the processor 230 (e.g., separately, or in combination) may apply one or more natural language processing operations to audio data (e.g., speech inputs) input at the communication device 205 and/or the communications application 244-*b*. The natural language processing operations may include, for example, linguistic context recognition, word recognition, speech recognition operations (e.g., speech-to-text operations). In some aspects, the verification engine 241 and/or the processor 230 may apply any of the natural language processing techniques to audio data (e.g., speech inputs) input at the communication device 205 and/or the communications application 244-*b*, thereby generating text data (e.g., a transcript, a partial transcript, a text summary, etc.) corresponding to the audio content.

In another example, the verification engine 241 and/or the processor 230 (e.g., separately, or in combination) may apply gesture recognition operations and/or object tracking operations to the video data (e.g., recorded or streamed video) input at the communication device 205 and/or the communications application 244-*b*. The gesture recognition operations may include, for example, facial recognition or bodily (e.g., hands, arms) recognition operations. The object tracking operations may include, for example, eye-gaze detection, eye tracking, head movement tracking, etc. In some cases, the object tracking operations may include bodily recognition operations supportive of sign language (e.g., American Sign Language (ASL), Pidgin Signed English (PSE), Signed Exact English (SEE), British, Australian and New Zealand Sign Language (BANZSL), etc.). In some cases, the object tracking operations may include lip-reading operations supportive of visual and audio-visual speech recognition. In some aspects, the verification engine 241 and/or the processor 230 may apply any of the gesture recognition techniques and/or object tracking techniques to video data input at the communication device 205 and/or the communications application 244-*b*, thereby generating content information and/or contextual information corresponding to the video content. For example, the verification engine 241 and/or the processor 230 may generate text corresponding to gesture recognition (e.g., sign language) and/or object tracking (e.g., lip reading).

In some aspects, the processing operations may include, for example, content extraction, content analysis, and context analysis. In an example, the verification engine 241 and/or the processor 230 may perform syntactic analysis (e.g., parse, analyze sentence structure, etc.) and/or semantic analysis on text generated by the natural language processing techniques (e.g., text generated by speech recognition operations). In some aspects of syntactic analysis, the verification engine 241 and/or the processor 230 may parse all or portions of the generated text. In an example, based on the syntactic analysis, the verification engine 241 and/or the processor 230 may apply semantic analysis to determine contextual information (e.g., semantics information) associated with the generated text.

In some other aspects, the verification engine 241 and/or the processor 230 may apply content extraction, content analysis, and context analysis (e.g., natural language processing operations, syntactic analysis, semantic analysis) described herein to text content (e.g., text-based communications, meeting invitations, identification information of users indicated in the meeting invitation, etc.) input, communicated, or stored by any of the communication device 205, the communications application 244-*b*, the scheduling application 244-*c*, and/or the application server 210. Alternatively, or additionally, the verification engine 241 and/or the processor 230 may apply content extraction, content analysis, and context analysis described herein to any multimedia data (e.g., text, audio, video) communicated, accessed, or stored by any of the communication devices 205, the communications application 244-*b*, the scheduling application 244-*c*, the database 215, and/or the application server 210.

In some examples, the contextual information may include an indication of whether a user (e.g., a moderator) intends to, or has intended to, record a meeting. For example, the contextual information may include an indication of whether the user intends to, or has intended to, record the meeting (e.g., record multimedia content associated with the meeting) using the communications application 244-*b*. In some aspects, the contextual information may include statements, phrases, and/or key words indicating that the user intends to, or has intended to, activate content sharing. Example statements, phrases, and key words are described herein with reference to FIG. 3.

In some aspects, the verification engine 241 and/or the processor 230 may apply analysis techniques described herein to user information (e.g., identification information, presence information, etc.) associated with a current meeting and/or a previous meeting, user information (e.g., identification information, invitation status, etc.) associated with a meeting invitation corresponding to the current meeting and/or the previous meeting, or the like. For example, the verification engine 241 and/or the processor 230 may compare user information associated with a current meeting to user information associated with a previous meeting (e.g., recorded or not recorded). Based on the comparison, the verification engine 241 and/or the processor 230 may determine whether to autonomously record the current meeting. In some examples, based on the comparison, the verification engine 241 and/or the processor 230 may determine whether to output a notification to record the current meeting (e.g., a notification prompting a user to record the current meeting).

The processing decisions and/or processing operations described herein may be performed autonomously by the verification engine 241, with or without human input.

The communication device 205 may render a presentation (e.g., visually, audibly, using haptic feedback, etc.) of an application 244 (e.g., browser 244-a, communications application 244-b, scheduling application 244-c). In an example, the communication device 205 may render the presentation via the user interface 245. Settings of the user interface 245 may be partially or entirely customizable and may be managed by one or more users, by automatic processing, and/or by artificial intelligence. The user interface 245 may include, for example, a display (e.g., a touchscreen display), an audio output device (e.g., a speaker, a headphone connector), or any combination thereof. In some aspects, the user interface 245 may indicate inputs associated with hardware components (e.g., a keyboard, a keypad, a mouse, a touchpad) integrated with or coupled to the communication device 205.

In some aspects, the applications 244 may be stored on the memory 240. In some cases, the applications 244 may include cloud-based applications or server-based applications (e.g., supported and/or hosted by the application server 210). In an example, the scheduling application 244-c may be a desktop application or mobile application associated with an office suite.

In an example, any of the applications 244 (e.g., browser application 244-a, communication application 244-b, scheduling application 244-c) may be configured to receive data in an electronic format and present content of data via the user interface 245. For example, the applications 244 may receive data from another communication device 205 or from the application server 210 via the communications network 220. The communication device 205 may display the data via the user interface 245.

For example, the communication device 205 may support the transmission and reception of communications (e.g., audio calls, video calls, instant messages, document transmissions) between users via the communications application 244-b. In some cases, the communications application 244-b may be referred to as an integrated communications application. For example, the communications application 244-b may support integrated audio, video, and text communications between communication devices 205. In some aspects, the communications application 244-b may support group communications between three or more users.

In some cases, the communications applications 244-b may support audio calling, video calling, instant messaging (e.g., including text data, audio, video, etc.), availability services (e.g., presence monitoring), and roster management services. In some aspects, the communications application 244-b may be integrated with a VOIP application. In some cases, the communications application 244-b may be a standalone application. In some other aspects, the communications application 244-b may be integrated with another application such as, for example, a social media application.

The communications application 244-b may support (e.g., in combination with the application server 210) the hosting and conducting of online meetings between users of the communication devices 205. In some examples, the communications application 244-b may support recording of multimedia content (e.g., audio and/or video) associated with the online meetings. The communications application 244-b may include example aspects of the communications application 107 described with reference to FIG. 1.

In some cases, the communications application 244-b may support the transcription of audio data communicated over the communications application 244-b and text analysis (e.g., content analysis, context analysis) of the transcribed text. The communications application 244-b may support real-time and/or periodic (e.g., based on a schedule or trigger condition) transcription and text analysis.

In some aspects, the communications application 244-b may support content sharing between multiple communication devices 205. Content sharing may include, for example, real-time sharing of content (e.g., screen sharing, document sharing, etc.) between communication devices 205.

In some cases, the communications application 244-b may support presence monitoring of users associated with a meeting. For example, the communications application 244-b may support monitoring and/or tracking of users attending a meeting. In some aspects, the communications application 244-b may identify a user classification (e.g., moderator, invitee, "required attendee", "optional attendee", etc.) of users attending the meeting. In some aspects, the communications application 244-b may identify whether a user attending the meeting is also included on a corresponding meeting invitation.

The scheduling application 244-c may support the creation, storage, organization, and viewing of meeting dates and appointments. In some aspects, the scheduling application 244-c may include task management features supportive the creation, storage, organization, and viewing of tasks according to various time schedules. In some cases, the scheduling application 244-c may support displaying meeting date and appointments in combination with the tasks. In some cases, the scheduling application 244-c may be a standalone scheduling application (e.g., a calendar application). In some aspects, the scheduling application 244-c may be integrated with the communications application 244-b. The scheduling application 244-c may include example aspects of the scheduling application 106 described with reference to FIG. 1.

The database 215 may include a relational database, a centralized database, a distributed database, an operational database, a hierarchical database, a network database, an object-oriented database, a graph database, a NoSQL (non-relational) database, etc. In some aspects, the database 215 may store and provide access to, for example, any of the stored data described herein.

The application server 210 may include a processor 250, a network interface 255, database interface instructions 260, and a memory 265. In some examples, components of the application server 210 (e.g., processor 250, network interface 255, database interface 260, memory 265) may communicate over a system bus (e.g., control busses, address busses, data busses) included in the application server 210. The processor 250, network interface 255, and memory 265 of the application server 210 may include examples of aspects of the processor 230, network interface 235, and memory 240 of the communication device 205 described herein.

For example, the processor 250 may be configured to execute instruction sets stored in memory 265, upon which the processor 250 may enable or perform one or more functions of the application server 210. In some aspects, the processor 250 may utilize data stored in the memory 265 as a neural network. In some examples, the application server 210 may transmit or receive packets to one or more other devices (e.g., a communication device 205, the database 215, another application server 210) via the communication network 220, using the network interface 255. Communications between components (e.g., processor 250, memory 265) of the application server 210 and one or more other devices (e.g., a communication device 205, the database 215) connected to the communication network 220 may, for example, flow through the network interface 255.

In some examples, the database interface instructions 260 (also referred to herein as database interface 260), when executed by the processor 250, may enable the application server 210 to send data to and receive data from the database 215. For example, the database interface instructions 260, when executed by the processor 250, may enable the application server 210 to generate database queries, provide one or more interfaces for system administrators to define database queries, transmit database queries to one or more databases (e.g., database 215), receive responses to database queries, access data associated with the database queries, and format responses received from the databases for processing by other components of the application server 210.

The memory 265 may be configured to store instruction sets, neural networks, and other data structures (e.g., depicted herein) in addition to temporarily storing data for the processor 250 to execute various types of routines or functions. For example, the memory 265 may be configured to store program instructions (instruction sets) that are executable by the processor 250 and provide functionality of the verification engine 266 described herein. One example of data that may be stored in memory 265 for use by components thereof is a data model(s) 267 (also referred to herein as a neural network model, a trained model, a detection model, a prediction model, etc.) and/or training data 268. The data model(s) 267 and the training data 268 may include examples of aspects of the data model(s) 242 and the training data 243 described with reference to the communication device 205. For example, the application server 210 (e.g., the verification engine 266) may utilize one or more data models 267 for recognizing and processing information obtained from communication devices 205, another application server 210, and the database 215. In some aspects, the application server 210 (e.g., the verification engine 266) may build and/or update one or more data models 267 based on learned information included in the training data 268.

In some aspects, components of the verification engine 266 may be provided in a separate engine in communication with the application server 210.

Figure 3:
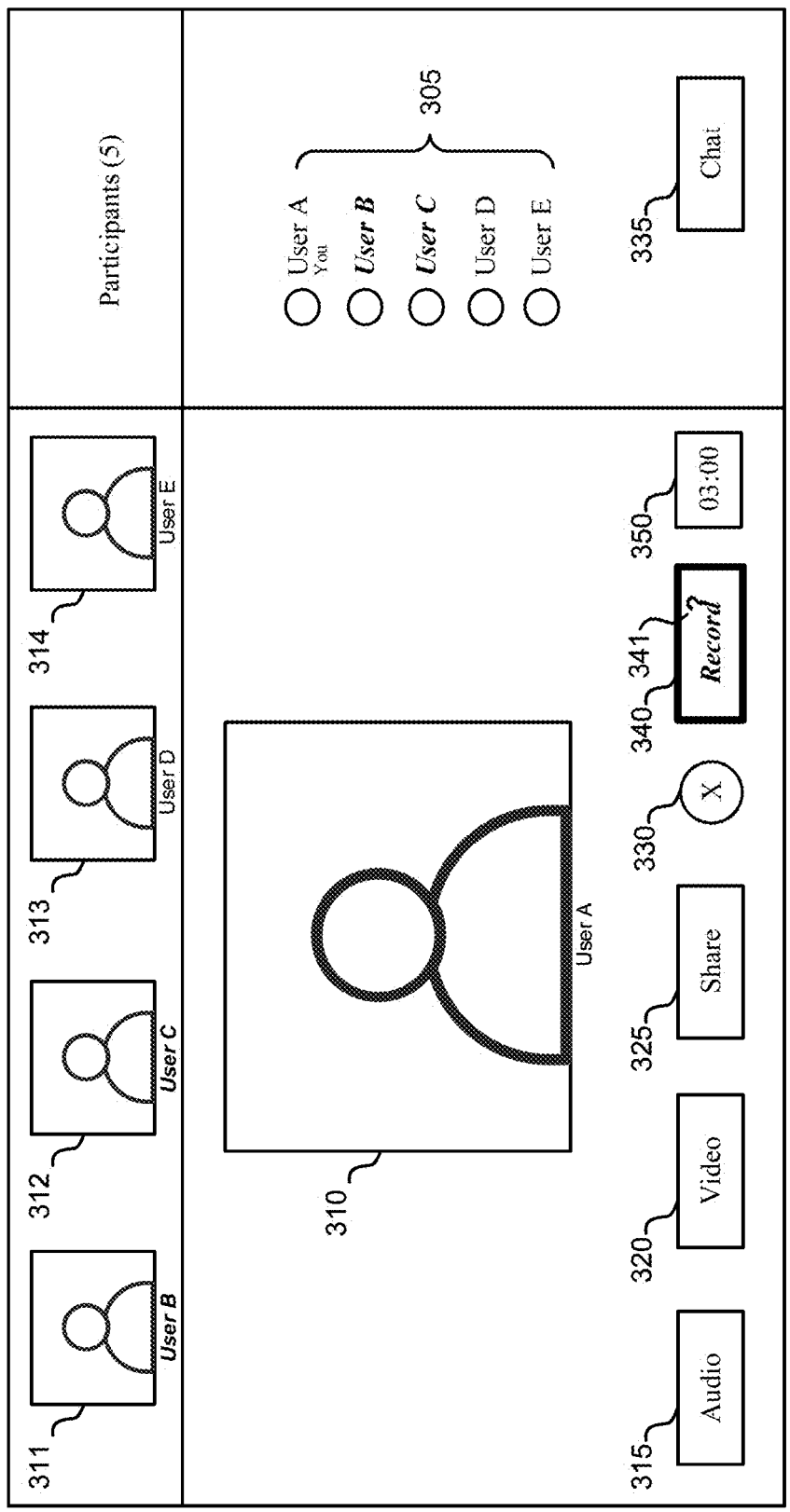
FIG. 3 illustrates an example of a communications application that supports intelligent meeting recording using AI algorithms in accordance with aspects of the present disclosure.

FIG. 3 illustrates an example of a communications interface 300 that supports intelligent meeting recording using AI algorithms in accordance with aspects of the present disclosure. The communications interface 300 may be implemented by examples of aspects of a communication device 105 or a communication device 205 described with reference to FIGS. 1 and 2. Example aspects of the communications interface 300 are described with reference to a communication device 205.

The communications interface 300 may be associated with a communications application (e.g., a communications application 244-b implemented at a communication device 205 described with reference to FIG. 2). For example, the communication device 205-a (e.g., using the communications application 244-b) may initiate a meeting (hereinafter referred to as an online meeting) between communication device 205-a (associated with a User A), communication device 205-b (associated with a User B), and communication device 205-c (associated with a User C), communication device 205-d (associated with a User D), and communication device 205-e (associated with a User E). In an example, the communications interface 300 illustrates an example interface at the communication device 205-a (associated with the User A) during the online meeting.

The communications interface 300 may include a list 305 of users associated with the online meeting (e.g., User A through User E). The online meeting may include any quantity of users. The users, for example, may be referred to as attendees of the online meeting. The communications interface 300 may include a user representation 310 (associated with User A), a user representation 311 (associated with User B), and a user representation 312 (associated with User C). The user representation 310 through user representation 312 may each include an icon, text (e.g., name, initials), photo image, and/or video image associated with a respective user.

In some aspects, the communications interface 300 may include a set of controls associated with the online meeting. For example, the set of controls may include a button 315 for muting/unmuting audio, a button 320 for starting/stopping video, a button 325 for sharing content (e.g., activating content sharing, selecting content to share), a button 330 for leaving or ending the online meeting, and a button 335 for accessing a chat panel (e.g., for sending text-based messages to one or more users during the online meeting), a button 340 for starting/pausing/stopping recording, and a meeting timer 350 indicating a current duration of the online meeting.

In some aspects, the communications interface 300 may be customizable (e.g., based on user preferences, user inputs, etc.). The set of controls described with reference to the communications interface 300 is an example, and any combination of the controls described herein and/or additional controls (e.g., buttons) for accessing functionalities associated with the communications application 244-b may be implemented at a communication device 205. Example aspects of the present disclosure are described herein with reference to the communication devices 205, the application server 210, and the communications interface 300 of FIGS. 2 and 3.

According to example aspects of the present disclosure, a communication device 205 (e.g., communication device 205-a) may support one or more machine learning techniques for automatically and intelligently analyzing data associated with a meeting. The data associated with the meeting may include, for example, data input and/or monitored by the communications application 244-b as described herein, data associated with a corresponding meeting invitation and the scheduling application 244-c as described herein, data associated with a previous meeting that was recorded (or not recorded) as described herein, etc.

Based on the analysis, the communications application 244-b (e.g., verification engine 241) may determine, predict, and/or verify whether the user intends to record (e.g., capture multimedia content associated with) an online meeting hosted or supported by the communications application 244-b. In an example, the communication device 205 may support machine learning techniques for automatically and intelligently analyzing the data associated with the meeting to provide a notification 341 and/or an auto-record feature for recording the meeting.

For example, the communication device 205-a (e.g., using the communications application 244-b) may initiate an online meeting between communication device 205-a (associated with a User A) through communication device 205-e (associated with a User E). In an example, the communication device 205-a (e.g., in combination with the application server 210) may initiate the online meeting based on a user input at the communication device 205-a. In some aspects, the communication device 205-a may initiate the online meeting automatically (e.g., based on a schedule). In an example, the communication device 205-b through communication device 205-*e* may join the online meeting automatically and/or based on respective user inputs at the communication device 205-*b* through communication device 205-*e*.

In the example of FIG. 3, User A may be a moderator, and User B through User E may be meeting attendees (e.g., co-hosts, invitees, etc.). In some aspects, the communication device 205-*a* may learn and/or predict, based on data associated with an online meeting (e.g., data input and/or monitored by a communications application 244-*b* at communication device 205-*a*, data associated with a meeting invitation corresponding to the online meeting, etc.), whether User A intends to record the online meeting.

Alternatively, or additionally, the application server 210 may analyze any of the data associated with the meeting as described herein, and the application server 210 may learn and/or predict whether User A intends to record the online meeting. The communication device 205-*a* and/or the application server 210 may calculate the predictions using a corresponding machine learning network (e.g., a machine learning network implemented by the verification engine 241, the verification engine 266).

The communication device 205-*a* may analyze data associated with an online meeting at any temporal instance. For example, the communication device 205-*a* may analyze the data at any temporal instance during an online meeting. In some other examples, the communication device 205 may analyze the data associated with the online meeting at any temporal instance prior to the online meeting. For example, the communication device 205-*a* may analyze the data when and/or after creating (e.g., by the scheduling application 244-*c*) a meeting invitation corresponding to the online meeting. An example of analyzing the data when and/or after creating the meeting invitation is later described with reference to FIG. 4. In some other examples, the communication device 205 may analyze the data associated with the online meeting any temporal instance after the online meeting. For example, after the conclusion of an online meeting.

In an example, during the online meeting, a recording operation may be inactive at the communication device 205-*a*. For example, User A may have forgotten to initiate recording of the meeting. Alternatively, or additionally, User A may have initiated a recording of the meeting at the communication device 205-*a*, but technical issues (e.g., an application error) may have terminated the meeting recording such that the meeting is no longer being recorded. In both examples, User A may be unaware that the meeting is not being recorded.

In an example, based on the analysis (e.g., by the communication device 205-*a* and/or the application server 210) of the data associated with the online meeting, the communication device 205-*a* may display a notification 341 indicating that the online meeting is not being recorded.

For example, the communication device 205-*a* may identify that the online meeting has a start time of 9:00 AM. The communication device 205-*a* (or the application server 210) may identify previous online meetings having similar attributes (e.g., based on content information, contextual information, attendees, meeting invitations, start/stop times, meeting durations, etc.) to the online meeting. In an example, the communication device 205-*a* may identify that, out of six (6) previous online meetings having similar attributes to the online meeting, five (5) of the previous online meetings were recorded. Accordingly, for example, the notification 341 may include an inquiry or confirmation request asking whether User A would like to record the online meeting. For example, the notification 341 may indicate "The system has detected that you are not recording. You have recorded 5 of the previous 6 meetings. Would you like to record the present meeting?"

The communication device 205-*a* may determine, based on an analysis of data (e.g., content information, context information, start/stop times, etc.) associated with the five (5) previous online meetings, that substantial discussions (e.g., the "real meeting") started at three (3) minutes following the meeting start time. In some cases, the communication device 205-*a* may determine that meeting recordings of the five (5) previous online meetings were initiated (e.g., on average) at 3 minutes following the meeting start times. Accordingly, for example, the notification 341 may include an inquiry or confirmation request asking whether User A would like to record the online meeting at a temporal instance of three (3) minutes following the meeting start time.

In some aspects, the communication device 205-*a* may output the notification 341 at the start of the online meeting. In some cases, the communication device 205-*a* may output the notification 341 at any temporal instance following the start time (e.g., scheduled start time, actual start time) of the online meeting. In some other aspects, the communication device 205-*a* may output the notification 341 at the predicted temporal instance (e.g., three (3) minutes) for initiating the recording. In an example, the notification 341 may indicate "You are not recording this meeting. You have previously started meeting recordings after an average duration of three (3) minutes. Would you like to record once the meeting timer is at three (3) minutes?" Alternatively, or additionally, the notification 341 may indicate "The meeting timer for the present meeting is three (3) minutes. You have previously started meeting recordings after an average duration of three (3) minutes. Would you like to record the meeting now?"

In some other aspects, the communication device 205-*a* may output the notification 341 based on user attendance at the online meeting. For example, the communication device 205-*a* may determine, based on an analysis of data (e.g., user presence information) associated with the five (5) previous online meetings, that the meeting recordings for the five (5) previous online meetings were initiated when a set of users (e.g., User B, User C) were present at the online meeting. Accordingly, for example, the notification 341 may include an inquiry or confirmation request asking whether User A would like to record the online meeting at a temporal instance corresponding to when the set of users join the online meeting. In an example, the notification 341 may indicate "The system has detected that you are not recording. You have recorded 5 of the previous 6 meetings when User B and User C were present. Would you like to record the present meeting once User B and User C have joined the meeting?" Alternatively, or additionally, the notification 341 may indicate "User B and User C have joined the meeting. You have recorded 5 of the previous 6 meetings when User B and User C were present. Would you like to record the present meeting?"

In other examples, the notification 341 may indicate "The system has detected that one or more users has mentioned recording this meeting. Would you like to record the present meeting?"

In an example, the notification 341 may include a user interface for confirming (e.g., an "OK" button) or cancelling (e.g., a "Cancel" button) the recording.

In some aspects, the notification 341 may include a link (e.g., a URL link, a Hyperlink, etc.) associated with accessing recordings (e.g., audio recordings, video recordings, corresponding transcripts, etc.) of any of the previous five (5) meetings. In some cases, the notification 341 may include descriptive information (e.g., keywords, recording summaries, etc.) corresponding to discussion topics of the recordings. Accordingly, for example, User A may refer to the recordings, the corresponding transcripts, and/or the corresponding descriptive information, based on which User A may determine whether to record the online meeting.

In another example, technical issues (e.g., an application error) may have resulted in the termination of recording the online meeting. Based on the trigger condition (e.g., termination of recording), the communication device 205-*a* may analyze data input and/or monitored by the communications application 244-*b* and predict whether User A intended to stop the recording. In an example, based on prediction that User A did not intend to stop the recording, the communication device 205-*a* may output the notification 341. Alternatively, or additionally, based on prediction that User A did intend to stop the recording, the communication device 205-*a* may refrain from outputting the notification 341.

In some aspects, the communication device 205-*a* may apply visual differences to any portion of the communication interface 300 described herein. For example, when alerting User A to initiate recording of an online meeting (e.g., alerting User A that the online meeting is not being recorded), the communication device 205-*a* may apply visual differences to any portion of the button 340 (e.g., a relatively thicker outline, highlighting, shading) and/or any text associated with the button 340 (e.g., bold italics for "Record"). The visual differences may include, for example, different highlighting, different colors, and/or different font types. In another example, the communication device 205-*a* may apply visual differences to any portion of list 305 and/or any text associated with the list 305 (e.g., bold italics for User B and User C).

The notifications described herein may be of any form. For example, the notification 341 may be an icon, a symbol (e.g., a question mark, an asterisk, an exclamation point), or a shape. In some aspects, the communication device 205-*a* may output any notification (e.g., notification 341) and/or apply visual differences to any portion of the communications interface 300 (e.g., list 305, button 340) in real-time during an online meeting.

In some aspects, the notifications (e.g., notification 341) may be a pop-up notification displayable on any portion of the user interface 245 (e.g., a display of the communication device 205-*a*). In an example, the communication device 205-*a* may output an audible notification and/or haptic notification via the user interface 245 in combination with any of the notifications described herein. In some cases, the communication device 205-*a* may generate and/or output the notification 341 using a scripting language (e.g., JavaScript, etc.) pop-up.

According to example aspects of the present disclosure, the machine learning network (e.g., included in or implemented by the verification engine 241, the verification engine 266, etc.) may support forward learning based on training data. For example, the communication device 205-*a* may support forward learning based on outputs (e.g., predictions) by the machine learning network. In some examples, the communication device 205-*a* may support forward learning based on past actions of a user (e.g., User A) with respect to previous predictions by the machine learning network. In some examples, the past actions may include previous instances of initiating and/or stopping a recording, and the example actions are not limited thereto. Based on the forward learning, the communication device 205-*a* may provide increased accuracy.

The output from the machine learning model may include probability information and/or confidence information associated with initiating and/or ending a recording of an online meeting. For example, the machine learning network (e.g., included in or implemented by the verification engine 241, the verification engine 266, etc.) may calculate probability scores (e.g., from 0.00 to 1.00) associated with the outputs (e.g., predictions) described herein by the machine learning network. In some aspects, the machine learning network may calculate confidence scores (e.g., from 0.00 to 1.00) respectively corresponding to the probability scores.

In an example, the communication device 205-*a* may output the notifications described herein (e.g., notification 341) for predictions having a probability score that satisfies (e.g., is greater than or equal to) a probability score threshold and/or a confidence score that satisfies (e.g., is greater than or equal to) a confidence score threshold. Alternatively, or additionally, the communication device 205 may refrain from displaying the notifications for predictions having a probability score that fails to satisfy (e.g., is less than) the probability score threshold and/or a confidence score that fails to satisfy (e.g., is less than) the confidence score threshold.

In examples, the communication device 205-*a* may support automatically recording an online meeting based on the forward learning. For example, the communication device 205-*a* may automatically initiate recording of an online meeting for predictions having a probability score that satisfies (e.g., is greater than or equal to) the probability score threshold and/or a confidence score that satisfies (e.g., is greater than or equal to) the confidence score threshold.

Figure 4:
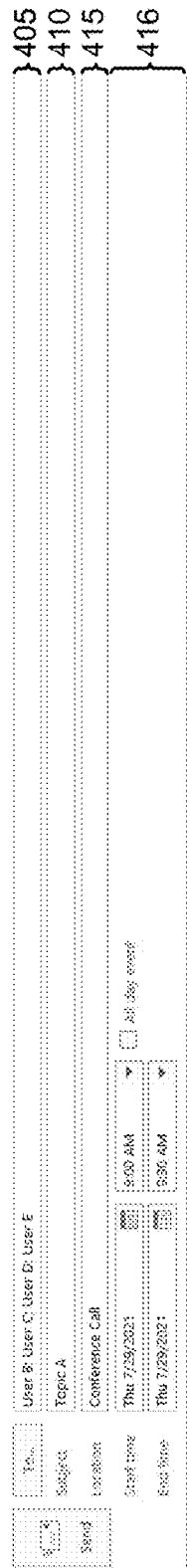
FIG. 4 illustrates an example of a scheduling application that supports intelligent meeting recording using AI algorithms in accordance with aspects of the present disclosure.
Figure 4:
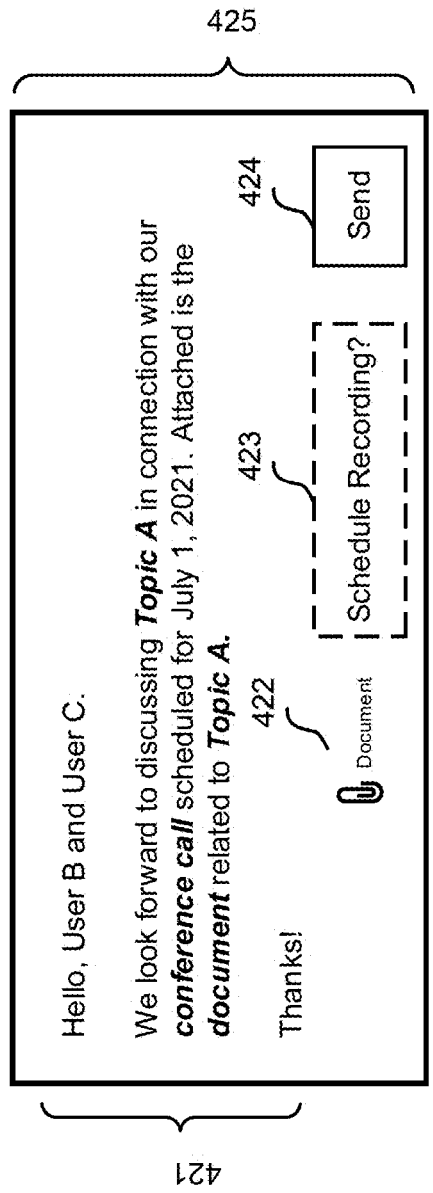

FIG. 4 illustrates an example of a scheduling interface 400 that supports intelligent meeting recording using AI algorithms in accordance with aspects of the present disclosure. The scheduling interface 400 may be implemented by examples of aspects of a communication device 105 or a communication device 205 described with reference to FIGS. 1 and 2.

The scheduling interface 400 may be associated with a scheduling application (e.g., a scheduling application 244-*c* described with reference to FIG. 2). In an example, the scheduling interface 400 corresponding to a meeting invitation associated with scheduling an online meeting described herein. In an example, the scheduling interface 400 may include an invitee entry field 405 (e.g., invitees), a subject entry field 410, a location entry field 415, a temporal information field 420 (e.g., start time, end time), and a message field 425. The message field 425 may include a button 424 for sending the meeting invitation.

In some aspects, the scheduling interface 400 may be customizable (e.g., based on user preferences, user inputs, etc.). For example, the scheduling interface 400 may display any combination of data entry fields described herein. Example aspects of the present disclosure are described herein with reference to the communication devices 205, the application server 210, and the communications interface 300 of FIGS. 2 and 3.

In an example, a user (e.g., User A) may have input a message 421 stating, "Hello, User B and User C. We look forward to discussing Topic A in connection with our conference call scheduled for Jul. 1, 2021. Attached is the document related to Topic A." The user may have included an attachment 422 (e.g., a document associated with Topic A) to the message 421.

According to example aspects of the present disclosure, a communication device 205 (e.g., communication device 205-*a*) and/or an application server 210 may analyze data included in the meeting invitation, when and/or after creating the meeting invitation. For example, based on the analysis, the communication device 205-*a* and/or the application server 210 may determine a probability score and/or confidence score corresponding to recording multimedia content for the online meeting.

In an example, the communication device 205-*a* may extract user information, temporal information, content information, and/or contextual information described herein from any of invitee entry field 405 (e.g., invitees), subject entry field 410, location entry field 415, temporal information field 420 (e.g., start time, end time), and message field 425. The communication device 205-*a* may analyze the extracted information. Based on the analysis, the communications application 244-*b* (e.g., verification engine 241) may determine, predict, and/or verify whether the user intends to record (e.g., capture multimedia content associated with) the online meeting. In an example, the communication device 205-*a* may compare the extracted information to data associated with previous online meetings. For example, the communication device 205-*a* may compare the extracted information to any of user information, temporal information, content information, and/or contextual information associated with previous online meetings (e.g., recorded or non-recorded online meetings). In an example, based on the analysis (e.g., comparisons), the communication device 205-*a* may provide a notification 423 and/or an auto-record feature for recording the meeting. Aspects of the analysis (e.g., data extraction, data comparison, etc.) may include examples of like elements described herein with respect to content analysis, context analysis, or the like.

For example, based on the analysis of the meeting invitation, the communication device 205-*a* may determine (e.g., from the invitee entry field 405, the message 421, etc.) that User A is a meeting moderator, User B and User C are "required attendees", and User D and User E are "optional attendees". In an example, the communication device 205-*a* may determine (e.g., from subject entry field 410, the message 421, the document 422, etc.) that a "Topic A" will be discussed during the online meeting (conference call) corresponding to the meeting invitation. The communication device 205-*a* may determine (e.g., from the temporal information field 420) that the online meeting will start at 9:00 AM.

The communication device 205-*a* (or the application server 210) may identify previous online meetings having similar attributes (e.g., based on content information, contextual information, attendees, meeting invitations, start/stop times, meeting durations, etc.) to the online meeting corresponding to the meeting invitation. In an example, the communication device 205-*a* may identify that, out of six (6) previous online meetings having similar attributes (e.g., User B and User C were "required attendees", a start time of 9:00 AM, discussion of "Topic A", etc.) to the online meeting, five (5) of the previous online meetings were recorded.

Accordingly, for example, the communication device 205-*a* may output a notification 423 including an inquiry or confirmation request asking whether User A would like to record (e.g., schedule a recording of) the online meeting. Aspects of generating, outputting, and/or displaying the notification 423 may include example aspects of the notification 341 described with reference to FIG. 3.

Figure 5:
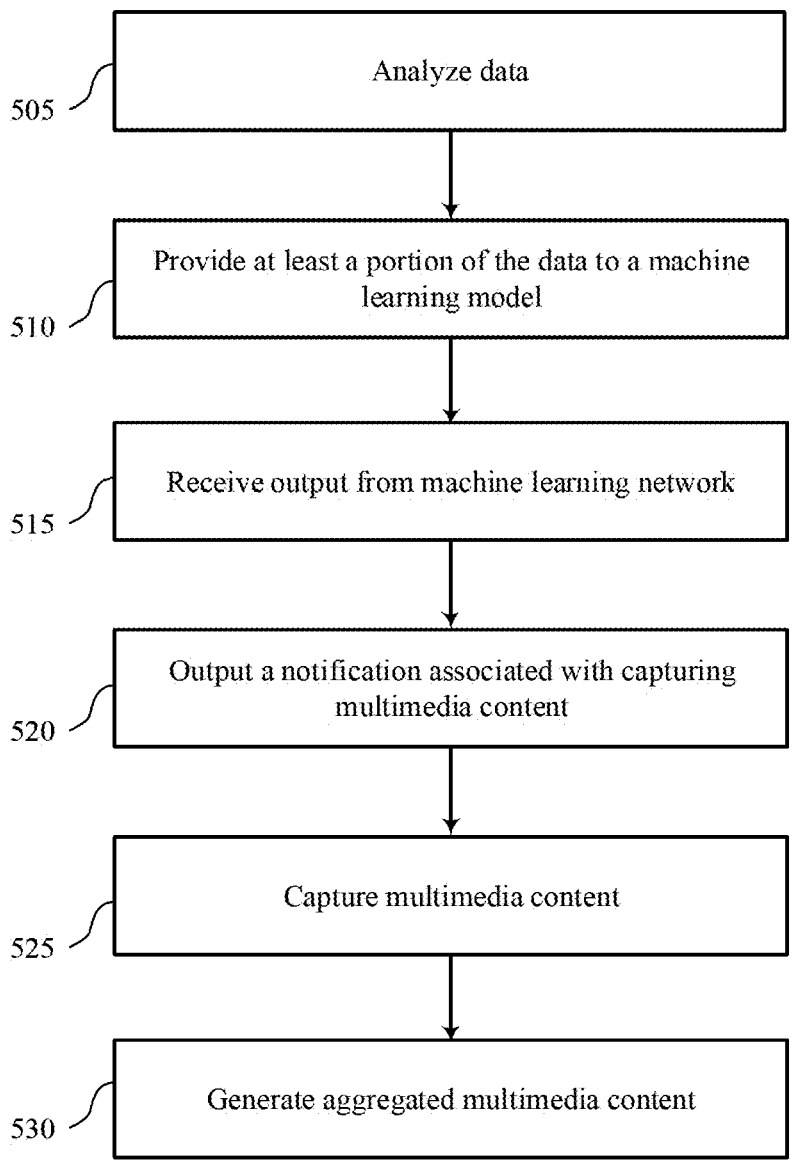
FIG. 5 illustrates an example of a process flow that supports intelligent meeting recording using AI algorithms in accordance with aspects of the present disclosure.

FIG. 5 illustrates an example of a process flow 500 that supports intelligent meeting recording using AI algorithms in accordance with aspects of the present disclosure. In some examples, process flow 500 may implement aspects of a communication device 105, an application server 110, a communication device 205, an application server 210, a communications interface 300, or a scheduling interface 400 described with reference to FIGS. 1 through 4.

In the following description of the process flow 500, the operations may be performed in a different order than the order shown, or the operations may be performed in different orders or at different times. Certain operations may also be left out of the process flow 500, or other operations may be added to the process flow 500. It is to be understood that while the communication device 105 is described as performing a number of the operations of process flow 500, any device (e.g., another communication device 105, an application server 210, a combination of a communication device 105 and an application server 110, etc.) may perform the operations shown.

At 505, a communication device 105 may analyze data associated with a conference call (e.g., an online meeting described herein).

At 510, the communication device 105 may provide at least a portion of the data to a machine learning model. In an example, the communication device 105 may provide all the data associated with the conference call to the machine learning model.

At 515, the communication device 105 may receive an output from the machine learning model in response to the machine learning model processing at least the portion of the data. In an example, the output may include a probability score associated with a determination made by the machine learning model with respect to capturing multimedia content associated with the conference call. In some aspects, the multimedia content may include audio data, text data, video data, or a combination thereof.

In an example, the data analyzed at 505 may include identification information of at least one user associated with the conference call, and providing at least the portion of the data to the machine learning model at 510 may include providing the identification information to the machine learning model. In an example, receiving the output from the machine learning model at 515 may occur in response to the machine learning model comparing the identification information and a user classification.

In another example, the data analyzed at 505 may include identification information of at least one user associated with the conference call. In some aspects, the at least one user may be included in a meeting invitation associated with the conference call. In an example, the output from the machine learning model may include a comparison result of: the identification information of the at least one user; and reference identification information of a set of users associated with at least one previous conference call.

In some examples, the data analyzed at 505 may include presence information of at least one user associated with the conference call. In an example, receiving the output from the machine learning model at 515 may occur in response to the machine learning model processing the presence information.

In some other examples, the data analyzed at 505 may include a meeting invitation associated with the conference call. In some aspects, analyzing the data may include extracting content information included in the meeting invitation. In an example, receiving the output from the machine learning model at 515 may occur in response to the machine learning model processing the content information.

In another example, the data analyzed at 505 may include a meeting invitation associated with the conference call, and analyzing the data may include determining contextual information associated with the meeting invitation. In an example, receiving the output from the machine learning model at 515 may occur in response to the machine learning model processing the contextual information.

In another example, the data analyzed at 505 may include the multimedia content. For example, the multimedia content may be received at a communication device 105 associated with a user attending the conference call. In an example, analyzing the data may include extracting content information included in the multimedia content, and receiving the output from the machine learning model at 515 may occur in response to the machine learning model processing the content information. In another example, analyzing the data may include determining contextual information associated with the multimedia content, and receiving the output from the machine learning model at 515 may occur in response to the machine learning model processing the contextual information.

For example, the content information may include at least one word, and receiving the output from the machine learning model at 515 may occur in response to the machine learning model comparing the at least one word and a set of words associated with initiating the capturing of the multimedia content. Alternatively, or additionally, the content information may include at least one word, and receiving the output from the machine learning model at 515 may occur in response to the machine learning model comparing a quantity of instances of the at least one word and a threshold value.

In another example, the data analyzed at 505 may include temporal information associated with the conference call, and providing at least the portion of the data to the machine learning model at 510 may include providing the temporal information associated with the conference call to the machine learning model. In an example, receiving the output from the machine learning model at 515 may be in response to the machine learning model comparing the temporal information associated with the conference call and second temporal information associated with a captured multimedia content of at least one previous conference call.

At 520, the communication device 105 may output a notification associated with capturing the multimedia content based on the output from the machine learning model. In some aspects, outputting the notification may be based on the output from the machine learning model.

In an example, the output from the machine learning model may include at least one of: a first temporal instance (e.g., a start time) associated with initiating the capturing of the multimedia content; and a second temporal instance (e.g., a stop time) associated with ending the capturing of the multimedia content. The notification output at 520 may include an indication of the first temporal instance, the second temporal instance, and/or a temporal duration calculated based on the first temporal instance and the second temporal instance.

In another example, the output from the machine learning model may include at least one of: a first comparison result associated with content information of the conference call and content information of at least one previous conference call; and a second comparison result associated with contextual information of the conference call and contextual information of the at least one previous conference call. The notification output at 520 may include a link associated with accessing captured multimedia content of the at least one previous conference call.

At 525, the communication device 105 may capture the multimedia content based on at least one of: a comparison result of the probability score and a threshold value; and a user input associated with the notification.

At 530, the communication device 105 may generate aggregated multimedia content based on the output from the machine learning model.

In an example, the output from the machine learning model at 515 may include at least one of: a first comparison result associated with content information of the conference call and content information of at least one previous conference call; and a second comparison result associated with contextual information of the conference call and contextual information of the at least one previous conference call. In some examples, the aggregated multimedia content generated at 530 may include at least a portion of the captured multimedia content associated with the conference call and at least a portion of captured multimedia content associated with the at least one previous conference call.

In some aspects not illustrated in example process flow 500, the communication device 105 (or system 100, or server 110) may train the machine learning network based on training data. In an example, the output provided by the machine learning network at 515 may be based on the training.

In an example, the training data may include: temporal information associated with capturing multimedia content associated with at least one previous conference call; a meeting invitation associated with the at least one previous conference call; identification information of at least one user associated with the at least one previous conference call; attendance information of the at least one user with respect to the at least one previous conference call; content information associated with the at least one previous conference call; contextual information associated with the at least one previous conference call; and a quantity of the at least one previous conference call.

In another example, the training data may include: a user input corresponding to the notification; one or more previous outputs by the machine learning model; and one or more user inputs corresponding to a notification associated with capturing multimedia content associated with at least one previous conference call.

In some aspects, the methods, devices, and systems described herein may be applied to communications application clients, instant messaging clients, and social media platforms (e.g., any client or platform supportive of content sharing with respect to a virtual meeting environment or a communications environment).

Artificial intelligence, including the utilization of machine learning, can be used in various aspects disclosed herein. For example, as discussed, various levels of content can be analyzed and classified, and this can be configurable by artificial intelligence and/or by user preference. Artificial intelligence, as used herein, includes machine learning. Artificial intelligence and/or user preference can configure information that is used to analyze content and identify relationships between content. For example, artificial intelligence and/or user preference can determine which information is compared to content in order to analyze the content. Artificial intelligence and/or user preference may also be used to configure user profile(s), which may be used to determine relevance to a user (e.g., the user associated with the user profile), a communication (e.g., message, audio communications, video communications), and/or an application by comparing the content to information contained within the user profile.

Some embodiments utilize natural language processing in the methods and systems disclosed herein. For example, machine learning models can be trained to learn what information is relevant to a user or different users. Machine learning models can have access to resources on a network and access to additional tools to perform the systems and methods disclosed herein.

In certain embodiments, data mining and machine learning tools and techniques will discover information used to determine content and/or contextual information. For example, data mining and machine learning tools and techniques will discover user information, user preferences, relevance of content, levels of relevance, contextual information, key word(s) and/or phrases, thresholds, comparison(s) to threshold(s), configuration(s) of content organization of content, and configuration(s) of a user interface, among other embodiments, to provide improved content analysis and/or contextual analysis.

Machine learning may manage one or more types of information (e.g., user profile information, communication information, etc.), types of content (including portions of content within communication information), comparisons of information, levels of relevance, and organization (including formatting of content). Machine learning may utilize all different types of information. The information can include various types of visual information, documents (including markup languages like Hypertext Markup Language (HTML)), and audio information (e.g., using natural language processing). Inputs and outputs, as described herein, may be managed by machine learning. Machine learning may determine variables associated with information, and compare information (including variables within the information) with thresholds to determine relevance. The relevance may determine content organization based on rules associated with the relevance. Machine learning may manage properties (including formatting, hiding and/or reorganizing) and configurations of the organized content. Any of the information and/or outputs may be modified and act as feedback to the system.

In some aspects, methods and systems disclosed herein use information to analyze content and contextual information. Relevance, and variations thereof, can refer to a determination of how closely a piece of information relates to another piece of information. For example, information may be information that is related to a user, and includes and is not limited to user profile information, association with groups, and information from interactions of the user. Information that is related to a user may be obtained from groups or entities associated with the user. Artificial intelligence and/or user preferences may determine the information that is relevant to a user. For example, artificial intelligence and/or user preference may determine what information is relevant (e.g., appropriate, inappropriate, related) to one or more users, communications, messaging windows, messaging applications, social media applications, etc. Artificial intelligence may use the information to build a profile associated with one or more users, where the profile defines what information (or variables within the information) is relevant to the user, previous communications with the user, current communications generated by the user, and other properties of the relevance (e.g., type of relevance (importance, priority, rank, etc.), level of relevance, etc.). Artificial intelligence and/or user preference may use the profile to compare information with content of a communication to determine relevance between the content (including any differences in relevance of various portions of the content), contacts indicated in the communication, contacts of a user generating the communication, messaging windows associated with the communication, messaging applications associated with the communication, and/or social media applications associated with the communication. Relevance of information is used in various embodiments herein to determine rules for how the content may be extracted and/or analyzed for contextual information.

Relevance, as described herein, includes determining how closely related information is. The determination may be by comparison, and may use any criteria, such as thresholds and/or one or more key words. The information may be content within a communication, where a communication can contain one or more pieces (also referred to herein as portions, sections, or items) of content, and may include content that ranges from being not related at all (e.g., not relevant) to content that is directly related (e.g., highly relevant) to contacts indicated in the communication, contacts of a user generating the communication, messaging windows associated with the communication, messaging applications associated with the communication, and/or social media applications associated with the communication. Portions of content may also be referred to herein as simply "content." There may be two levels of relevance (e.g., relevant and not relevant), or any number of levels of relevance. Any information may be compared to determine relevance. In various embodiments, user information may be used to determine relevance. The user information may include profile information, such as one or more user profiles, that is compared to content. Various types of relevance may be determined for one or more pieces of information, including relevance, priority, importance, precedence, weight, rank, etc. For example, relevance may determine how related content is to a user, contacts indicated in the communication, contacts of a user generating the communication, messaging windows associated with the communication, messaging applications associated with the communication, and/or social media applications associated with the communication, while priority ranks how important the content is. In various embodiments, priority may be based on how relevant a piece of content is. Any combination of one or more types of relevance may be configured and used. For example, content may have high relevance with a low priority and a low rank, content may have high relevance with a high importance and high rank, content may have low relevance with a high importance and a low priority, etc. Content may have any combinations of types of relevance.

As used herein, information includes communications, messages, electronic records, content, visual content including text and images, audio content, rich media, data, and/or data structures. Communications include emails, messages, documents, files, etc. Information includes content, and communications include content (also referred to herein as data). Content may be one type or multiple types (e.g., text, images, hyperlinks, etc.) and there may be multiple pieces of content within a communication or a piece of information, regardless of content type. Content may contain one or more variables. Communications may be data that is stored on a storage/memory device, and/or transmitted from one communication device to another communication device via a communication network.

Communications include multimedia communications (e.g., audio communications, video communications, messages). Audio, video, and/or messages may be transmitted via one or more data packets. The formatting of such data packets may be based on the communication protocol used for transmitting the data packets over the communication network.

Information related to communications may be referred to herein as communication information, communication data, or communication content, and variations of these terms. Communication information can include any type of data related to communications of a user and/or entity (e.g., information being sent to user(s), received from user(s), created by user(s), accessed by user(s), viewed by user(s), etc.). Content of a communication can include information associated with the communication as well as information contained within the communication. Content of a communication may include information not only that is sent and received, but also other information such as information that a user does not necessarily send or receive. Content of communications may be classified in various ways, such as by a timing of the content, items the content is related to, users the content is related to, key words or other data within fields of the communication (e.g., to field, from field, subject, body, etc.), among other ways of classifying the content. The content may be analyzed based on information associated with the content and/or variable(s), including the location of the content and/or variables as it relates to the communication (e.g., a field, sender, recipient, title, or body location within the communication).

As used herein, a data model may correspond to a data set that is useable in an artificial neural network and that has been trained by one or more data sets that describe communications between two or more entities. The data model may be stored as a model data file or any other data structure that is useable within a neural network or an artificial intelligence system.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very large-scale integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively, or additionally, methods described or claimed herein can be performed using artificial intelligence, machine learning, neural networks, or the like. In other words, a system is contemplated to include finite instruction sets and/or artificial intelligence-based models/neural networks to perform some or all of the steps described herein.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
analyzing data associated with a conference call;
providing at least a portion of the data to a machine learning model;
receiving an output from the machine learning model in response to the machine learning model processing the at least the portion of the data, the output comprising a probability score associated with a determination made by the machine learning model with respect to capturing multimedia content associated with the conference call;
outputting a notification associated with capturing the multimedia content based at least in part on the output from the machine learning model; and
capturing the multimedia content based on at least one of: a comparison result of the probability score and a threshold value; and a user input associated with the notification.

2. The method of claim 1, wherein:
the data comprises identification information of at least one user associated with the conference call;
providing at least the portion of the data to the machine learning model comprises providing the identification information to the machine learning model; and
receiving the output from the machine learning model occurs in response to the machine learning model comparing the identification information and a user classification.

3. The method of claim 1, wherein:
the data comprises identification information of at least one user associated with the conference call, wherein the at least one user is included in a meeting invitation associated with the conference call; and
wherein the output from the machine learning model comprises a second comparison result of:
the identification information of the at least one user; and
reference identification information of a set of users associated with at least one previous conference call.

4. The method of claim 1, wherein:
the data comprises presence information of at least one user associated with the conference call; and
receiving the output from the machine learning model occurs in response to the machine learning model processing the presence information.

5. The method of claim 1, wherein:
the data comprises a meeting invitation associated with the conference call;
analyzing the data comprises extracting content information included in the meeting invitation; and
receiving the output from the machine learning model occurs in response to the machine learning model processing the content information.

6. The method of claim 1, wherein:
the data comprises a meeting invitation associated with the conference call;
analyzing the data comprises determining contextual information associated with the meeting invitation; and
receiving the output from the machine learning model occurs in response to the machine learning model processing the contextual information.

7. The method of claim 1, wherein:
the data associated with the conference call comprises the multimedia content, wherein the multimedia content is received at a device associated with a user attending the conference call;
analyzing the data comprises extracting content information included in the multimedia content; and
receiving the output from the machine learning model occurs in response to the machine learning model processing the content information.

8. The method of claim 7, wherein:
the content information comprises at least one word; and
receiving the output from the machine learning model occurs in response to the machine learning model comparing the at least one word and a set of words associated with initiating the capturing of the multimedia content.

9. The method of claim 7, wherein:
the content information comprises at least one word; and
receiving the output from the machine learning model occurs in response to the machine learning model comparing a quantity of instances of the at least one word and a second threshold value.

10. The method of claim 7, wherein the multimedia content comprises audio data, text data, video data, or a combination thereof.

11. The method of claim 1, wherein:
the data associated with the conference call comprises the multimedia content, wherein the multimedia content is received at a device associated with a user attending the conference call;
analyzing the data comprises determining contextual information associated with the multimedia content; and
receiving the output from the machine learning model occurs in response to the machine learning model processing the contextual information.

12. The method of claim 1, wherein:
the data comprises temporal information associated with the conference call;
providing at least the portion of the data to the machine learning model comprises providing the temporal information associated with the conference call to the machine learning model; and
receiving the output from the machine learning model is in response to the machine learning model comparing the temporal information associated with the conference call and second temporal information associated with a captured multimedia content of at least one previous conference call.

13. The method of claim 1, wherein the output from the machine learning model comprises at least one of:
a first temporal instance associated with initiating the capturing of the multimedia content; and
a second temporal instance associated with ending the capturing of the multimedia content.

14. The method of claim 1, wherein:
the output from the machine learning model comprises at least one of:
a second comparison result associated with content information of the conference call and content information of at least one previous conference call; and
a third comparison result associated with contextual information of the conference call and contextual information of the at least one previous conference call; and
outputting the notification is based at least in part on the output from the machine learning model, wherein the notification comprises a link associated with accessing captured multimedia content of the at least one previous conference call.

15. The method of claim 1, wherein:
the output from the machine learning model comprises at least one of:
a second comparison result associated with content information of the conference call and content information of at least one previous conference call; and
a third comparison result associated with contextual information of the conference call and contextual information of the at least one previous conference call; and
the method further comprises:
generating aggregated multimedia content based at least in part on the output from the machine learning model,
wherein the aggregated multimedia content comprises at least a portion of the captured multimedia content associated with the conference call and at least a portion of captured multimedia content associated with the at least one previous conference call.

16. The method of claim 1, further comprising:
training the machine learning model based at least in part on training data, the training data comprising at least one of:
temporal information associated with capturing multimedia content associated with at least one previous conference call;
a meeting invitation associated with the at least one previous conference call;
identification information of at least one user associated with the at least one previous conference call;
attendance information of the at least one user with respect to the at least one previous conference call;
content information associated with the at least one previous conference call;
contextual information associated with the at least one previous conference call; and
a quantity of the at least one previous conference call,
wherein the output provided by the machine learning model is based at least in part on the training.

17. The method of claim 1, further comprising:
training the machine learning model based at least in part on training data, the training data comprising at least one of:
a user input corresponding to the notification;
one or more previous outputs by the machine learning model; and
one or more user inputs corresponding to a notification associated with capturing multimedia content associated with at least one previous conference call,
wherein the output provided by the machine learning model is based at least in part on the training.

18. A device comprising:
a processor; and
a memory in electronic communication with the processor, wherein the memory stores data that, when executed by the processor, enables the processor to:
analyze data associated with a conference call;
provide at least a portion of the data to a machine learning model;
receive an output from the machine learning model in response to the machine learning model processing the at least the portion of the data, the output comprising a probability score associated with a determination made by the machine learning model with respect to capturing multimedia content associated with the conference call;
output a notification associated with capturing the multimedia content based at least in part on the output from the machine learning model; and
capture the multimedia content based on at least one of:
a comparison result of the probability score and a threshold value; and a user input associated with the notification.

19. A system comprising:
a machine learning model;
a device comprising:
a processor; and
a memory in electronic communication with the processor, wherein the memory stores data that, when executed by the processor, enables the processor to:
analyze data associated with a conference call;

provide at least a portion of the data to the machine learning model;

receive an output from the machine learning model in response to the machine learning model processing the at least the portion of the data, the output comprising a probability score associated with a determination made by the machine learning model with respect to capturing multimedia content associated with the conference call, wherein the output from the machine learning model comprises at least one of:
- a first temporal instance associated with initiating the capturing of the multimedia content; and
- a second temporal instance associated with ending the capturing of the multimedia content; and output a notification associated with capturing the multimedia content based at least in part on the output from the machine learning model.

20. The device of claim 18, wherein the output from the machine learning model comprises at least one of:
- a first temporal instance associated with initiating the capturing of the multimedia content; and
- a second temporal instance associated with ending the capturing of the multimedia content.

\* \* \* \* \*